(12) United States Patent
Hanisch et al.

(10) Patent No.: US 9,780,419 B2
(45) Date of Patent: Oct. 3, 2017

(54) METHOD FOR RECLAIMING ACTIVE MATERIAL FROM A GALVANIC CELL, AND AN ACTIVE MATERIAL SEPARATION INSTALLATION, PARTICULARLY AN ACTIVE METAL SEPARATION INSTALLATION

(75) Inventors: Christian Hanisch, Braunschweig (DE); Wolfgang Haselrieder, Braunschweig (DE); Arno Kwade, Wendeburg (DE)

(73) Assignee: Lion Engineering GmbH, Braunschweig (DE)

( * ) Notice: Subject to any disclaimer, the term of this patent is extended or adjusted under 35 U.S.C. 154(b) by 875 days.

(21) Appl. No.: 14/238,479

(22) PCT Filed: Aug. 10, 2012

(86) PCT No.: PCT/DE2012/000811
§ 371 (c)(1),
(2), (4) Date: Jun. 17, 2014

(87) PCT Pub. No.: WO2013/023640
PCT Pub. Date: Feb. 21, 2013

(65) Prior Publication Data
US 2014/0290438 A1 Oct. 2, 2014

(30) Foreign Application Priority Data

Aug. 12, 2011 (DE) .................. 10 2011 110 083

(51) Int. Cl.
B02C 23/00 (2006.01)
H01M 10/54 (2006.01)
(Continued)

(52) U.S. Cl.
CPC ............ *H01M 10/54* (2013.01); *B02C 23/06* (2013.01); *B02C 23/08* (2013.01); *B07B 4/08* (2013.01);
(Continued)

(58) Field of Classification Search
CPC .................. B02C 23/08; B02C 23/00; B02C 19/06–19/068; H01M 10/54; B07B 4/08; Y02W 30/84; C22B 26/12
(Continued)

(56) References Cited

U.S. PATENT DOCUMENTS

2005/0241943 A1 11/2005 Kakuta et al.

FOREIGN PATENT DOCUMENTS

| AT | 386 769 B | 10/1988 |
|----|-----------|---------|
| DE | 298 03 442 U1 | 11/1998 |

(Continued)

OTHER PUBLICATIONS

Hanisch et al., "Recovery of Active Materials from Spent Lithium-Ion Electrodes", Glocalized Solutions for Sustainability in Manufacturing—Proceedings of the 18th CIRP International Conference on Life Cycle Engineering, Jan. 1, 2011, pp. 85-89.
(Continued)

*Primary Examiner* — Faye Francis
(74) *Attorney, Agent, or Firm* — Whitham, Curtis & Cook, P.C.

(57) ABSTRACT

A method for retrieving active material from a galvanic cell is provided. The galvanic cell includes an active material, a support for the active material and a binder for bonding the active material and the support. The method includes the following steps: (a) crushing the cells, in particular under inert gas or in a vacuum, so that solid cell fragments are also formed, (b) heating the solid cell fragments up to the decomposition temperature ($T_z$), which is high enough to
(Continued)

Figure 1:
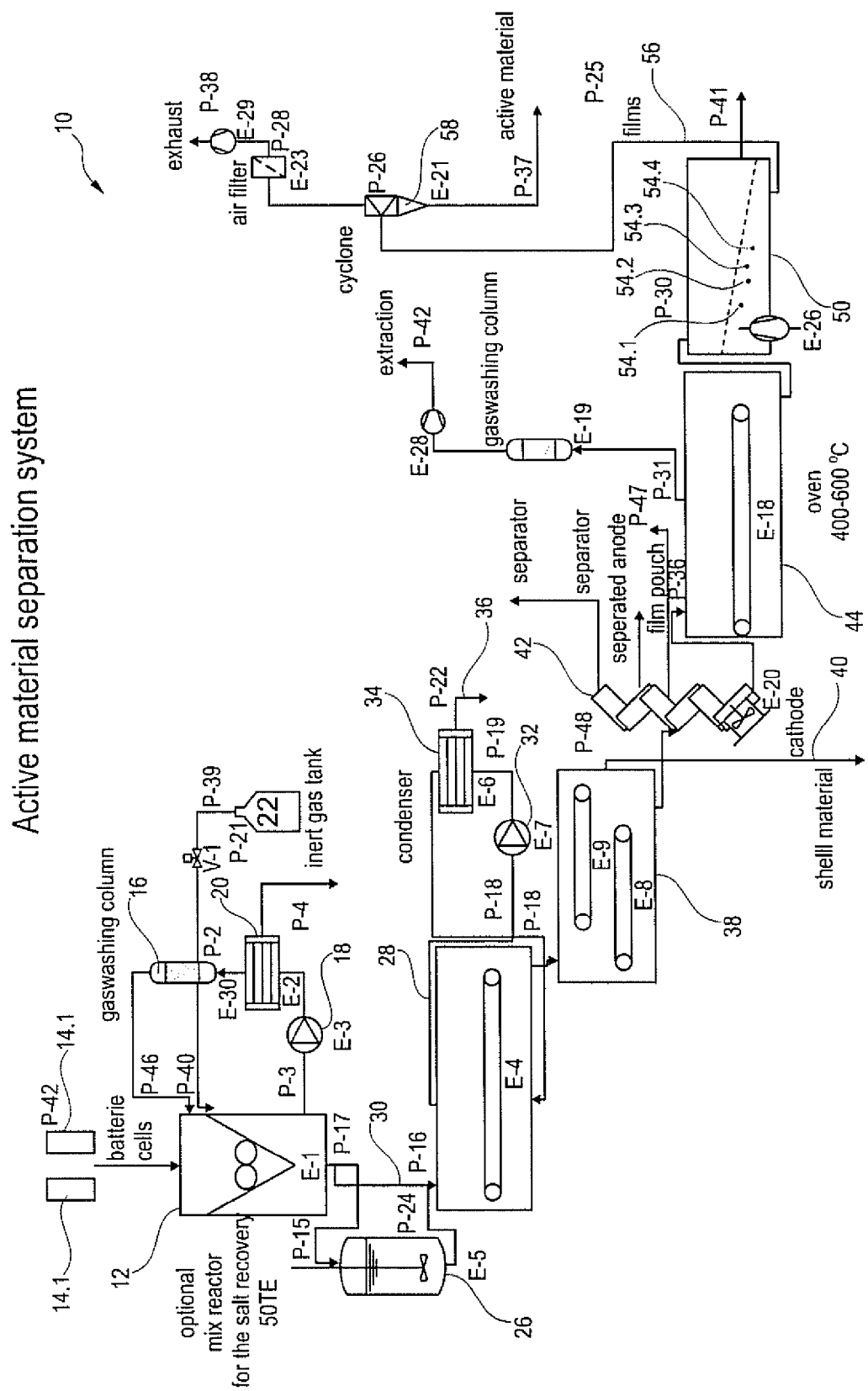

make the binder decompose so that it loses its binding properties, preferably under inert gas or in a vacuum, such that heat treated cell fragmented are formed, and (c) classifying the heat treated cell fragments, whereby (d) the classifying comprises air jet sieving and (e) the air jet sieving is carried out in such a way that the active material is separated from the support.

10 Claims, 2 Drawing Sheets

(51) Int. Cl.
*B02C 23/06* (2006.01)
*B02C 23/08* (2006.01)
*B07B 4/08* (2006.01)
*C22B 26/12* (2006.01)
*H01M 10/052* (2010.01)

(52) U.S. Cl.
CPC .............. *C22B 26/12* (2013.01); *B02C 23/00* (2013.01); *H01M 10/052* (2013.01); *Y02W 30/84* (2015.05)

(58) Field of Classification Search
USPC ..................................... 241/2, 5, 23, 69, 60
See application file for complete search history.

(56) References Cited

FOREIGN PATENT DOCUMENTS

| DE | 198 42658 A1 | 4/1999 |
| DE | 199 54 998 A1 | 5/2011 |
| EP | 1 215 742 A1 | 6/2002 |

OTHER PUBLICATIONS

Krueger et al, "Recycling of Lithium-Ion Batteries", 18th International Conference on Solid State Ionics (SSI-18), Warsaw University of Technology, Jan. 1.

METHOD FOR RECLAIMING ACTIVE MATERIAL FROM A GALVANIC CELL, AND AN ACTIVE MATERIAL SEPARATION INSTALLATION, PARTICULARLY AN ACTIVE METAL SEPARATION INSTALLATION

The invention concerns a method for retrieving active material, in particular lithium or lithium compounds, from a galvanic cell, which comprises an active material, a support for the active material, a binder for bonding the active material and the support and if necessary an electrolyte, with the steps: (a) crushing the cells, in particular under inert gas, so that solid cell fragments are also formed, (b) heating the solid cell fragments up to the decomposition temperature, which is high enough to make the binder decompose and/or evaporate, such that heat treated cell fragments are formed, and (c) classifying the heat treated cell fragments.

According to a second aspect, the invention concerns an active metal separation system, which is set up to retrieve active material, in particular lithium, from a galvanic cell, which comprises an active material, a support for the active material, a binder for bonding the active material and the support, and an electrolyte, with (a) a cell crushing device for the crushing of cells, wherein the cell crushing device is gas-proof and comprises an inert gas supply mechanism, so that the cells can be crushed to cell fragments under inert gas, and (b) an oven that is connected at least indirectly to the cell crushing device and is set up to heat the cell fragments up to the decomposition temperature, which is high enough to make the binder decompose.

When recycling active material, in particular lithium from lithium accumulators or batteries, the problem arises that the chemical processes are relatively complex. The reason for this is that the separation of the active material from its support is only partially achieved.

A method is known from US 2005/0241943 A1, in which the cells are first crushed and then undergo heat treatment. Afterwards the cells are shredded and heated up to the decomposition temperature. Subsequently, the heat-treated cell fragments are separated by a vibration sieve. It has been shown, however, that this method is complex. The object of the invention is to improve the retrieval of active material, in particular of lithium or lithium compounds, from old batteries or accumulators.

From DE 199 54 998 A1 A a cutting mill is known, in which the material cut by the cutting rotor is continually conveyed through a sieve, in particular an air jet sieve, with which only those particles which fall below a given size can leave the device.

From DE 29 803 442 U1 an air jet sieve for analysis is known, with which a high number of analyses can be carried out in a short time, and which features for this purpose several sieve surfaces offset against each other. This air sieve is used to determine the particle size distribution in the fine particle range.

From AT 386 769 B an air jet multi-deck sieve machine is known, by means of which dry, free flowing bulk materials of small particle size can be classified into up to 25 divisions in one step.

The invention solves the problem with a generic method in which the classifying comprises air jet sieving. According to a second aspect, the invention solves the problem with an active metal separation system, which possesses an air jet sieving device, which is at least directly connected to the oven and which is set up to classify active material and its support, in particular support foil.

An advantage of the invention is that the active material can be obtained with a high degree of purity. The reason for this is that with air jet sieving very small mesh sizes can be used, such that small impure particles are also kept away.

It is also advantageous that the support material can be also retrieved with a high degree of purity. For example, aluminium foil is frequently used as the support, which can only be recycled efficiently if it fulfils certain minimum requirements regarding purity. For example, support foil with more than 0.03% impurity is not especially suitable for recycling. During further hydrometallurgical processing, transition metal salt solutions from an acidic lithium solution are inclined to agglomerate if they contain more than the approx. 1% aluminium contamination typical of conventional separation. This aspect is due to the fact that aluminium hydroxide complexes form which tightly bind the agglomerates. These solid agglomerates cannot be completely ground during the conventional process, which leads to waste. The aluminium-contaminated transition metal salt solutions manufactured in this way would then have to be expensively cleaned before grinding. When aluminium content is reduced to below 0.1%, this effect is no longer observed. Once an aluminium contamination of only 0.05-0.06% is achieved, the materials can then be recycled in an ecologically and economically beneficial way. As a result of the fact that with air jet sieving the active material is knocked off on impact with the sieve, a very high degree of purity can be obtained for the support, in particular the support foil.

The invention is based on the knowledge that the heating of the cell fragments up to the decomposition temperature would theoretically have to be enough to destroy the binder to the extent that the active material is set free, but such that the active material is nevertheless difficult to remove from the support. The reason as to why the active material adheres to the support without a binder is to date still unexplained. With air jet sieving, the support, with the active material still adhered to it, powerfully impacts upon the sieve. This impact removes the active material hitherto adhered to the support so that it can be retrieved.

Due to the impact of the support upon the sieve and the separation effect thus caused, air jet sieving can also be described as separation by collision. The air jet sieving device can likewise also be described as a collision separation device and the air jet sieve as a collision separator.

The invention thus also concerns an active material separation system, which features a collision separation device, which is least indirectly connected to the oven and is set up to classify active material and support, in that the air jet sieve is operated in such a way that the active material is also separated from the support by means of a collision with a sieve of the collision separation device and/or with a baffle plate.

Air jet sieving is known as a laboratory method for the separation of small particles from other small particles. However, the heat treated cell fragments have a diameter many orders of magnitude larger than the particles of the active material, meaning that that the ability of air jet sieving to separate two sorts of particles which both have small diameters is irrelevant for the method according to the invention. In the method according to the invention, air jet sieving is also used as an additional separation step.

In the context of the present description, the crushing of the cells is understood in particular to mean cutting, shattering, chaffing or squashing. This can take place at temperatures between −195.79° C. and 100° C., such that requirements with regards to temperature conditions are negligible.

The heating up of solid cell fragments is understood in particular to mean heating up in gas-proof container, so that oxygen, for example, is prevented from the entering. In particular, the heating up takes place under inert gas or in a vacuum.

The active material is understood in particular to mean a bond which can reversibly take up and release lithium ions. On the cathode side, for example, lithium nickel manganese cobalt oxide, lithium nickel aluminium oxide and lithium iron phosphate; on the anode side, for example, graphite.

The support for the active material is understood in particular to mean a support foil, upon which the active material is placed in the form of particles. The support foil can, for example, be aluminium foil. The binder can, for example, be polyvinylidene fluoride (PVDF).

The crushing of cells and/or the heating up of solid cell fragments best takes place under inert gas, for example under nitrogen. It is favourable for the crushing of cells to take place at ambient temperature, in particular at a temperature of at the most 30°, wherein it can be advantageous for the crushing device, with which the cells are crushed, to be cooled, so that the heat influence upon the cells remains negligible.

The method according to invention is preferably performed as continual process and not in batches.

The throughput preferably amounts to more than 100 tons per year. Air jet sieving has to date been used at laboratory level, where it is used for the processing of samples in batches. Furthermore, these samples are very small. The use of the air jet sieving on a mass scale is currently unknown.

According to a preferred version of the invention, galvanic cells are used whose active material is formed of particles, whereby the particles have a particle diameter distribution and whereby this particle diameter distribution has a 90% diameter which corresponds to a diameter which is larger than the diameter of 90% of all particles and which is smaller than the diameter of 10% of all particles, whereby the air jet sieving takes place with a sieve whose mesh size corresponds at most to 200 times the 90% diameter. The indicated particle diameter is the one which is retained by the sieving.

The mesh size of the sieve is preferably a maximum of 250 μm, in particular a maximum of 100 μm. Modern lithium ion batteries possess an active material which is composed of particles with a diameter of less than 200 μm. With traditional sieving methods, for example with vibration sieving, a substantially larger mesh size must be chosen so that the sieving time does not become so long that the method becomes uneconomical. A larger mesh size, however, has the consequence that more dirt particles pass through the sieve, meaning that the purity of the obtained active material decreases.

The galvanic cells preferably always comprise at least one anode and at least one cathode, whereby the anodes and cathodes are heated up together and the resulting heat treated cell fragments can be classified together in the same air jet sieve. The feature that the anodes and the cathodes are heated up together is understood to mean that a mixture of both is heated up in the same device. This is possible because air jet sieving leads to a sufficiently accurate separation of current collecting foil and coating particles.

The method preferably comprises the step that, before heating the cell fragments up to the decomposition temperature, the cell fragments are dried at a drying temperature, so that dry cell fragments and drying vapours are formed, whereby the drying vapours are at least partly condensed. This has the advantage that the electrolyte solvent can be retrieved. It is therefore advantageous for the drying temperature to be below 100° C., in particular below 80° C.

The heating of cell fragments up to the decomposition temperature is preferably carried out under inert gas or in a vacuum. This has the advantage that copper then does not oxidise, such that both the anode and the cathode can be processed together. This again leads to a particularly simple separation process, which nevertheless produces recycled products which are sorted to a high degree of accuracy. Inert gas is understood to mean a gas or a gas mixture which under the present ambient conditions reacts neither with copper nor with aluminium (current collecting foils). The copper can thus be retrieved with a high degree of purity as a valuable element.

The method preferably comprises the step of treating the dry cell fragments by means of magnetic separators, so that iron-free cell fragments are formed. It is favourable for these iron-free cell fragments to be classified, for example by a zigzag classifier. The iron-free cell fragments are then heated up to the decomposition temperature of the binder.

The decomposition temperature is preferably at least 350° C. and at the most 800° C. It has been found that at these temperatures the binder is certain to decompose.

Preferably, the electrolyte agent is also removed during cell crushing under inert gas. This increases the recycling rate.

According to a preferred version of the invention, the crushing of cells is carried out in such a way that the median of the longest diameters of the resulting foil fragments does not fall below 200 μm. According to a preferred version of the invention, the crushing of cells is carried out in such a way that at least 80% of the foil fragments have a diameter of over 200 μm, whereby the diameter is determined by sieving.

According to a preferred version of the invention, the air jet sieving takes place in such a way that an air flow rate of at least 250 cubic meters of air per hour and square meter of sieve surface is reached, in particular at least 500 cubic meters of air per hour and square meter of sieve surface. At least 750 cubic meters of air per hour and square meter of sieve surface is particularly favourable. As a result a particle speed is reached that is high enough for the impact to bring about a high level of separation.

Preferably, a cyclone is set up behind the air jet sieve. It is also favourable for the support air behind the air jet sieve to be sucked away.

To keep energy consumption as low as possible, it is favourable for the sieve to be exposed to the air flow containing the particles at least on a large proportion of its surface.

The active material separation system preferably possesses a pre-dryer which is set up in the material flow, behind the cell crushing device and before the oven. The pre-dryer is configured to heat the cell fragments up to the drying temperature.

The active material separation system preferably additionally comprises a magnetic separator in the material flow, behind the pre-dryer and before the oven.

It is favourable for the active material separation system to feature a stirred reactor for the retrieval of conducting salt, which is connected to the cell crushing device and which at least partly removes the liquid fraction from the cell crushing device.

The method for retrieving active material from galvanic cells is understood in particular to mean a method in which electrodes from the electrode production are processed, without the electrodes necessarily having been built into a galvanic cell, although they could be built into a galvanic cell. In other words, the method can also be a method for in-process recycling.

According to a preferred version of the invention, a baffle plate is set up behind the sieve with respect to the flow of air and cell fragments. As a result, the particles of active material which have only collided weakly with the sieve break away from the support on impact with the baffle plate, which increases the separation efficiency.

According to a preferred version of the invention, the cell crushing device comprises at least one impact mill. As a result of the large number of collisions in the impact mill, the bond between the active material and the support is loosened. Additionally, the cell crushing device preferably comprises at least one shredder and/or cutting device whereby it is particularly advantageous for it to be set up before the impact mill and in the direction of material flow.

Additionally according to the invention is the use of an air jet sieve in a process, in particular a continual process, for retrieving active material, in particular lithium and/or lithium bonds, for example from used batteries and/or accumulators as well as from waste material from the production of batteries and/or accumulators.

Figure 2:
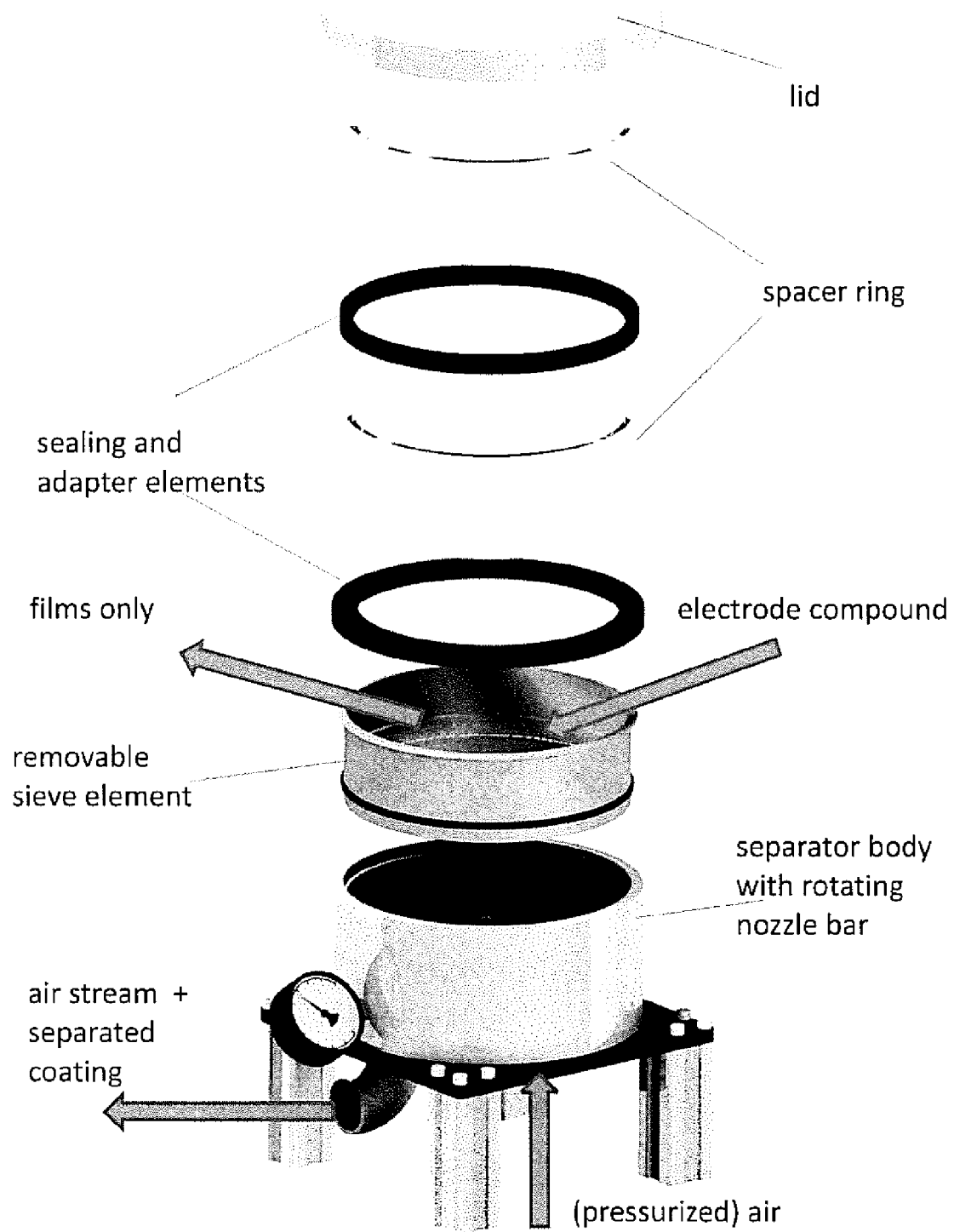

In the following the invention is further explained with reference to the attached drawings. They show:

FIG. 1 a flow chart of an active material separation system according to the invention, for carrying out the method according to the invention and FIG. 2 an exploded drawing of a version of a collision separator of the active material separation system according to FIG. 1.

FIG. 1 shows a flow chart of the active material separation system 10 according to the invention, which possesses a cell crushing device 12, to which galvanic cells 14.1, 14.2, . . . are supplied. The cell crushing device 12 is gas-proof and comprises a gas washing column 16, a circulation pump 18 and a condenser 20, by means of which inert gas, for example nitrogen, is circulated and purified. The cell crushing device additionally comprises an inert gas tank 22 for adjusting the inert gas pressure in the cell crushing device 12. The condenser 20 possesses an electrolyte outlet 24, through which condensed electrolyte can be removed.

A stirred reactor 26 can be set up in the direction of material flow behind the cell crushing device 12, which is set up to remove the liquid fraction from the cell crushing device 12, and to stir it, so that the conducting salt from the galvanic cells 14 (references without a number after them indicate the generic object) can be retrieved.

A pre-dryer 28 is set up in the direction of material flow behind the cell crushing device 12, which is connected to the cell crushing device 12 via a pipe 30. During crushing of the galvanic cells 14, resulting cell fragments arrive at the pre-dryer 28 via the pipe 30. Here there is a dry temperature $T_t$ of preferably $T_t=80°$ C. The pre-dryer 28 comprises a circulation pump 32 and a condenser 34 for condensing electrolyte, which can be removed via the pipe 36. The pre-dryer 28 is designed to be gas-proof and is flushed with inert gas by the circulation pump 32.

A separator 38 is set up in the direction of material flow behind the pre-dryer 28, which comprises a magnetic separator and, if necessary, an eddy flow separator also. The magnetic material is removed via a discharge pipe 40. Non-magnetic material arrives at a classifier 42, for example a zigzag classifier. The classifier 42 is, like the separator 38, optional, and is then particularly advantageous if only the cathode of the galvanic cells is to be re-used, as in the present case. The anodes are also removed in the same way as the pouch foils, if present.

An oven 44 is set up in the direction of material flow behind the classifier 42, in which there is a decomposition temperature $T_z$ between 400 and 600° C. The binder, for example polyvinylidene flouride (PVDF), thus decomposes. The decomposed product is removed via the discharge pipe 46 and taken to the gas washing column 48.

An air jet sieve 50 is set up in the direction of material flow behind the oven 44. The air jet sieve 50 comprises a sieve element 52. The heat treated cell fragments coming from the oven 44 are delivered to the air jet sieve. This is characterised by the fact that an air flow is supplied above or below the finely meshed sieve element (20-200 μm). This air flow is drawn from below the sieve. As a result of the air flow, the electrode fragments are whirled up and then placed under mechanical stress. This stress assists in the separation of support foil and coating. The active material particles are thus drawn by the flow of air through the meshes and are subsequently separated off by a cyclone. The foil fraction (aluminium and copper) is held back by the sieve element and can be obtained as a metal fraction and used again.

FIG. 2 shows an exploded view of a collision separator or an air jet sieve. The heat treated cell fragments that are to be separated are taken to one side of the sieve, and a moving air flow is blown from the other side, for example by way of a moving nozzle system, in the direction of the sieve. The cell fragments are thus hurled against the baffle plate, which takes the form of a baffle cover, and are separated there into the support and the coating.

On the side of the sieve from which the air jet is blown onto the sieve there is an intake nozzle, by means of which the blown-in air is removed together with the coating. The baffle plate is kept apart from the sieve by spacer rings.

| List of reference numbers |
| --- |
| 10 Active material separation system |
| 12 Cell crushing device |
| 14 Galvanic cell |
| 16 Gas washing column |
| 18 Circulation pump |
| 20 Condenser |
| 22 Inert gas tank |
| 24 Electrolyte outlet |
| 26 Stirred reactor |
| 28 Pre-dryer |
| 30 Pipe |
| 32 Circulation pump |
| 34 Condenser |
| 36 Pipe |
| 38 Separator |
| 40 Discharge pipe |
| 42 Classifier |
| 44 Oven |
| 46 Discharge pipe |
| 48 Gas washing column |
| 50 Air jet sieve |
| 52 Sieve element |
| 54 Particle |
| 56 Discharge pipe |
| 58 Cyclone |
| $T_t$ Dry temperature |
| $T_z$ Decomposition temperature |

The invention claimed is:

1. A method for retrieving active material from a galvanic cell, wherein the galvanic cell comprises an active material, a support for the active material and a binder for bonding the active material and the support, comprising the steps of:
   (a) crushing the galvanic cell, under inert gas or in a vacuum, to form solid cell fragments,
   (b) heating the solid cell fragments up to a decomposition temperature, which is high enough to make the binder decompose so that the binder loses its binding properties to form heat treated cell fragments, and then
   (c) separating the active material from the support by classifying the heat treated cell fragments by means of an air jet sieve,
   wherein a collision of the active material and support with a sieve and/or baffle plate of the air jet sieve causes the the separation of the active material from the support.

2. The method according to claim 1, wherein
   the active material of the galvanic cell is formed of particles, and
   the air jet sieve has a mesh size that is up to 200 times a specified diameter, wherein the specified diameter corresponds to a diameter which is larger than the diameter of 90% of all particles and which is smaller than the diameter of 10% of all particles.

3. The method according to claim 2, wherein the mesh size of the sieve is a maximum of 200 µm.

4. The method according to claim 1, wherein the galvanic cell comprises at least one anode and at least one cathode, wherein the at least one anode and at least one cathode are heated up together and wherein the resulting heat treated cell fragments are classified together in the same air jet sieve.

5. The method according to claim 1, further comprising the steps of:
   drying the solid cell fragments at a drying temperature to form dry cell fragments and drying vapours and
   at least partly condensing the drying vapours to retrieve electrolyte solvents
   before heating the solid cell fragments up to the decomposition temperature.

6. The method according to claim 1, wherein the heating of the solid cell fragments up to the decomposition temperature takes place under inert gas or in a vacuum.

7. The method according to claim 5, further comprising the steps of:
   treating the dry cell fragments by means of magnetic separation to form iron-free cell fragments, and
   classifying the iron-free cell fragments.

8. The method according to claim 1, wherein the galvanic cell comprises an electrolyte and at least a portion of the electrolyte is removed during crushing of the galvanic cell under inert gas.

9. The method according to claim 1, wherein the crushing of the galvanic cell is carried out in such a way that the median diameter of the solid cell fragments does not fall below 200 µm.

10. The method according to claim 1, wherein the binder evaporates at the decomposition temperature.

* * * * *